May 27, 1947.  W. P. PENTY  2,421,216
PROCESS OF MAKING READY-TO-EAT FOOD
Filed June 11, 1943
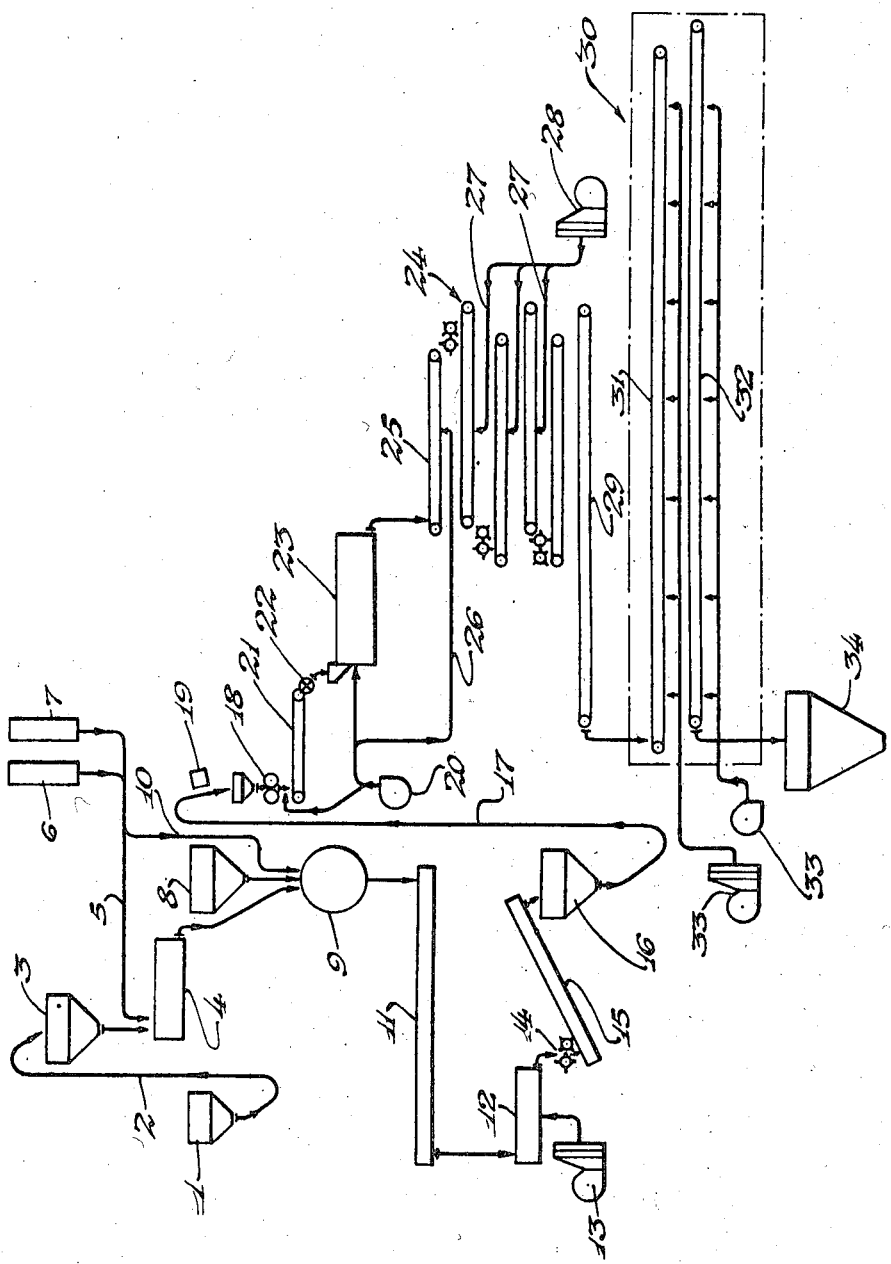
Inventor:
William P. Penty
By Lee J. Gary
Attorney.

Patented May 27, 1947

2,421,216

UNITED STATES PATENT OFFICE 2,421,216

PROCESS OF MAKING READY-TO-EAT FOOD

William P. Penty, Battle Creek, Mich., assignor to Kellogg Company, Battle Creek, Mich., a corporation of Delaware Application June 11, 1943, Serial No. 490,460

5 Claims. (Cl. 99—83)

This invention relates to a novel ready-to-eat cereal or breakfast food composition and the process of making the same, and is a continuation-in-part of my co-pending applications Serial No. 420,651, filed November 27, 1941, and Serial No. 449,874, filed July 6, 1942.

More specifically the present invention relates to cooked, ready-to-eat cereal composition of the shredded type breakfast food which is readily digestible, of pleasing taste, of high nutritive value, and particularly of enhanced protein content.

In general my invention relates to the compositing of particles of cereal grains such as corn, rye, wheat, light or heavy bran, rice or oat groats, all of which have a high starch but low protein content, with particles of de-fatted soya beans, in the form of grits, flakes or meal, and which conversely have a high protein but low carbohydrate content.

Although soya beans provide a ready, economical and good source of protein, and are additionally desirable because of their amino acid content, they have not per se been found acceptable to the occidental palate because of their characteristic beany or bitter flavor. However, in accordance with my invention I have been enabled to composite a substantial proportion of de-fatted soya bean with cereal grains in a manner whereby the objectionable characteristic taste of the soya bean is diluted, masked out or otherwise eliminated, and a novel composite of pleasing and acceptable taste, appearance and form provided.

Other objects and advantages of my invention will be readily apparent from a consideration of the following specification and accompanying drawing.

The single figure of the drawing illustrates diagrammatically a suitable arrangement of apparatus for carrying out my invention, the showing being in flow-sheet form, the arrow-designated lines indicating movement of the materials operated upon from step to step in the process, and also the path of the air circulation employed.

Referring to the drawing, the reference numeral 1 indicates a hopper for holding a bulk supply of what is hereinafter referred to as "de-fatted soya bean particles." This term is intended to include soya bean grits, meal or flakes which have been treated previous to use in my process so as to have a fat or oil content of less than about 1½ per cent, and preferably less than 0.75 per cent, and generally resulting from solvent extraction treatment of soya beans. Use of soya de-fatted to such extent is necessary to insure good keeping qualities of the final product, and to permit proper processing or good shredding in the mills, as hereinafter more fully set forth.

It will be understood that in this condition the de-fatted soya bean particles have already been subjected to at least limited cooking or heat treatment as a result of distillation followed by steaming for removal of the solvent, and may have been subjected to additional moisture conditioning treatment for the alleged purpose of "de-bittering." However, even in the latter condition the characteristic objectionable soya bean taste or flavor persists. The de-fatted soya bean particles which I employ, preferably have a moisture content of from about 10 to about 12 per cent.

As occasion demands a supply of the soya material is passed from hopper 1 through line 2 to batch hopper 3 from which it is passed to a mixing vat 4. A flavoring solution is passed to the vat 4 through line 5 composed of "corn flake flavor" from tank 6 and water from tank 7. The corn flake flavor in tank 6 is generally composed of an aqueous solution of sugar, salt and malt, and is proportioned with water from tank 7 to form a solution containing about 8% sugar, 3½% salt and a small percentage of malt extract. The amount of solution introduced from line 5 to each batch of material in vat 4 is the proportion of about one part by weight of solution to about three parts by weight of de-fatted soya bean particles, or about one gallon of solution for each 25 pounds of the soya material. In the mixing vat 4 the soya material is permitted to soak in or become tempered with the flavoring solution for a period of about one hour at which time all of the solution becomes absorbed by the de-fatted soya bean particles.

The cereal grain to be composited is contained in hopper 8 in the form of particles such as corn grits, bumped or deformed rye, wheat or oat groats, light or heavy bran, or rice ground to about one-third size, and the like particles, and is passed therefrom to a suitable cooker 9, such as a rotary steam cooker. This cooker is maintained at from about 15 to about 20 pounds steam pressure, means being provided for the admission and discharge of steam, so as to permit the cooking to be carried out at a temperature of from about 250° F., to about 260° F., and at a gauge pressure of from about 15 to about 20 pounds per square inch. Flavoring solution from tanks 6 and 7 is introduced through line 10 to cooker 9, and the cereal grain particles, without the soya material, first cooked for a predetermined length of time with a proportioned amount of flavoring solution.

The flavoring solution added to the cereal grain particles in cooker 9 is in proportion to the original moisture content of the cereal grain and the desired amount of moisture in the particles on leaving the cooker which is from about 30 to about 45 per cent, giving consideration to some slight condensation of steam in the cooker, and also the rate of hydrolysis and gelatinization of the particular cereal grains. Thus with corn grits which have a moisture content of about 10 to about 12 per cent, I may add 1 part by weight of flavoring solution to 3 parts by weight of corn grits, or about 3¼ gallons of solution to 75 pounds of corn grits. On the other hand with rice particles which have a similar or slightly higher moisture content, but which hydrolyze and gelatinize more rapidly, about 1½ gallons of solution for 75 pounds of ground rice has been found suitable.

The total period of cooking to which I subject the cereal component is correlated to the conditions of temperature and pressure, moisture content and particle size, and the desired condition of the product. Thus for the purpose of further processing it is desired that the cereals remain in the form of discrete, but soft and pliable particles at the end of the cooking period and that the cooking be carried to an extent where the starches are hydrolyzed and highly dextrinized and the particles superficially gelatinized, with no free starch or white center, and with the particles having a light adhesive action on the intermediately added soya bean particles. Thus the total cooking time for Nos. 6 and 7 size corn grits under the aforementioned conditions is about one and one-half hours. With larger sizes such as No. 4 grits the cooking time is longer. On the other hand with rice ground to one-third size the over-all cooking time is about thirty-five minutes.

The cooking time of the de-fatted soya bean particles in accordance with my process is such as to cause them to be partially cooked under the same cooking conditions and to be discharged at the end of the full cereal cooking period in likewise discrete particle form but lightly adhered to the cereal particles by means of the superficially gelatinized condition of the latter. The cooking period of the soya material must be limited however to prevent decomposition of the soya proteins and the formation of humins with attendant discoloration and darkening by hydrolysis of the proteins. Under the given cooking conditions and with limited absorbed moisture content I have found that the so tempered de-fatted soya bean particles can only be cooked for about twenty minutes. During this period of cooking part of the mal-flavor of the soya is removed and the particles become softened although to a lesser degree than the cereals.

Thus for the purpose of jointly cooking the cereal and soya bean particles and to enable them to become uniformly blended and distributed, and to enable the cooked mass to be discharged in the form of discrete particles, with particles of soya bean adhered to particles of cereal, and which would not result if each were separately cooked and later mechanically mixed, at least by reason of loss of adhesive character of the cereals on separate discharge and cooling, I find it necessary to interrupt the cooking of the cereal about twenty minutes before the predetermined over-all cereal cooking time, and introduce the tempered soya from vat 4 to cooker 9, and jointly cook the two for about twenty minutes to complete the cooking of the cereal and to give the soya the requisite limited amount of cooking under substantially the same conditions of steam pressure to which the cereal was subjected during the initial cooking period.

During the first twenty-five per cent of the period during which the cereal is cooked alone, the cook is briskly agitated to thoroughly mix the material in the cooker with the flavor. Thereafter, the cook is mildly agitated until the soya is introduced into the cooker at which time the cook is again vigorously agitated to the end of the cooking period to thoroughly mix and blend the two together.

The cook is then removed from the cooker 9 and passed to a screw conveyor 11. As the mixed mass is removed from the cooker it has a moisture content of from about 30 to about 45 per cent. The conveyor 11 delivers the mass to drying vat 12 where it is dried to a moisture content of from about 24 to about 32 per cent, a fan 13 delivering air at about 130° F., to the vat 12 to facilitate the drying action. The mass delivered from vat 12 passes between pickers 14 which function to loosen the mass and prevent it from becoming an adherent solid, the loosened material being passed to a conveyor 15 from whence it is delivered to a tempering tank 16. In the tank 16 the mass is permitted to temper for about fifteen to thirty minutes before delivery to the next step in the process.

The tempered mass is then passed, as indicated by the line 17, to a suitable shredding mill 18 wherein the mass is shredded. In passing to the mill 18 the mass is passed in the vicinity of a magnet 19 whereby any ferromagnetic particles which may have accidentally found their way into the mass may be removed. A fan 20 may blow air at about 70° F., into contact with the shreds passing from mill 18 and the shreds may be delivered to a conveyor 21. From the conveyor 21 the shredded mass is passed through a rotary cutter 22 whereby the shreds may be cut into one or two inch lengths. This shredding step, in addition to the specific two-stage or interrupted cooking process, characterizes my process and the resulting product for the reason that by the masticating or compacting action of the shredding mill the particles of soya become substantially uniformly spread out over and substantially uniformly mixed with the cereal particles and cohered thereto by pressure through the shredding rolls so that the two become bonded or "welded" together and retain such relationship throughout the subsequent processing. This shredding action with its attendant mixing and bonding in addition to permitting the composite to be toasted and lightly puffed or blistered and of a porous relatively lighter nature, holds the two materials in a state of good dilution so as to form a product without discernible objectionable beany taste. The results obtained by the shredding action are distinguished from those obtainable by a step such as for example flaking, for the reason that a flaking operation causes separation of the lightly cohered particles, and in addition does not properly mix the soya with the cereal with the result that necessary dilution cannot be effected and concentrated portions of soya remain which are noticeable and objectionable to taste. Another reason among others for unsuitability of flaking is that such flakes cannot properly puff or blister to the uniform extent and appearance desired, since the soya particles per se cannot be puffed by toasting due to substantial absence of starches or carbohydrates.

The cut shreds are then delivered to a rotary dryer 23 wherein the shreds are tumbled while simultaneously air is passed from the fan 20 through the dryer. The interior of the dryer may be provided with vanes, pickers or baffles whereby the drying shreds are kept in separated relationship and prevented from forming into a dough-like mass during the drying period, since this is a critical period in the physical formation of the final product. The shreds discharged from the dryer 23 contain about 20 to 28 per cent moisture.

The shreds are then passed to a flight conveyor 24 which may be positioned in an oven. The first flight 25 may be supplied with air from fan 20, as indicated by line 26 and the remaining flights may be provided with air, as indicated by lines 27, from fan 28, the air delivered from the latter being at about 130 to 135° F. The shredded mass as it leaves the flight 24 has a moisture content of about 7 to 15 per cent, and preferably from about 9 to about 12 per cent.

After leaving the flight dryers 24 the dried shreds are delivered to a conveyor 29 from whence they are passed to a toasting oven 30.

The toasting oven 30 may be of the basket, flight conveyor type having flights 31 and 32, the first flight 31 being supplied with air under pressure from fan 33, the air being at a temperature of between about 425 to 550° F. Subsequently, when the mass is delivered to the second flight 32, it is subjected to air blown by fan 33 at a temperature of about 70° F.

The shreds upon leaving the second flight 32 are delivered to the food tank 34 and have a moisture content of about 2.5 per cent. By subjecting the shreds to the higher temperature of between about 425 to 550° F., on the first flight 31 for about 15 to 30 seconds, the shreds delivered to the tank 34 will be browned, slightly puffed or blistered and porous.

The composite cereal product formed in accordance with the foregoing process produced crisp elongated shreds of a golden brown color with a slightly puffed or blistered appearance and which were of relatively light weight, approximately one-fifth, that is of greatly increased bulk per unit weight relative to the original components. When eaten with milk or cream the product was highly palatable and tender and devoid of the objectionable characteristic taste of soya beans, and of enhanced protein content as well as minerals such as calcium and iron.

I prefer to use about 25 per cent soya to about 75 per cent cereal which has been found to give a tasty product of excellent appearance and which provides in the composite a protein content of about 16 to about 18 per cent. Good results may, however, be obtained with from about 15 per cent to as high as about 40 per cent of de-fatted soya bean particles.

The following examples are illustrative of my process.

Example I 75 pounds of grated Nos. 6-7-8 corn grits were cooked with about 3¼ gallons of flavoring solution comprising water, 8 per cent sugar, 3½ per cent salt and a small percentage of malt extract, the cooking taking place for a period of about one hour and ten minutes in the steam cooker 9, the pressure being maintained at about 20 pounds per square inch, and the cooker being maintained at high gear for about the first 20 minutes of the cooking period. That is, the cook was briskly agitated for the initial cooking period. Subsequently, the cooker was maintained at low gear, that is, the cook was mildly agitated. The cooker was then opened and 25 pounds of medium ground de-fatted soya bean grits, which had previously been tempered with one gallon of a flavoring solution similar to that hereinbefore described, were introduced into the cooker and the corn and soya grits were cooked together with the cooker in high gear for a period of about 20 minutes, the steam pressure being maintained at about 20 pounds per square inch.

The cook was then removed from the cooker 9 and dried in the vat drier 12. Cold air was passed into the mass for about 3 minutes and then air at about 130° F., was passed into contact with the mass for about 13 minutes, the mass being permitted to cool for an additional 2 minutes. The moisture content of the mass at this stage was found to be about 28.8 per cent. The mass was then permitted to temper in the tempering tank 16 for about 15 minutes to cause uniform dispersion of moisture throughout the cooked cereal. The tempered mass was then shredded in the mill 18 and the shreds were cut into 1 and 2 inch lengths and dried in the rotary oven 23, the pickers or vanes in the oven being employed to separate the shreds so as to prevent them from becoming doughy or lumpy. The cut shreds were then dried in the flight drier 24, air being passed into contact therewith at about 140° F., for about 25 minutes to reduce the moisture content to about 8.7 per cent, and then toasted in the oven 30 until brown and slightly puffed.

Example II

Another example of my process employing rye with soya comprises the cooking of 75 pounds of washed, tempered, steamed and bumped or deformed rye in the cooker 9, with 2½ gallons of flavor solution from tanks 6 and 7, the flavor and rye being cooked for about 50 minutes at 15 pounds per square inch steam pressure. The cooker was then opened and 25 pounds of ground, de-fatted soya bean grits which had been previously soaked and tempered with 1 gallon of flavor solution for about one hour, were cooked with the rye for an additional 20 minutes at 15 pounds per square inch steam pressure. The mass, having a moisture content of about 44.9 per cent was removed from the cooker and dried at about 130° F., to about 28 per cent moisture; tempered and shredded at about 25 per cent moisture content. The shreds were dried at about 130° F., to about 9.7 per cent moisture content and toasted at 425° F.

Example III

A further example of my process employing wheat with soya comprises the cooking of 75 pounds of washed, tempered, steamed raw wheat which has been bumped to change the structure of the grain, the grain being cooked in the cooker 9 with 2½ gallons of flavor solution for about 50 minutes at 15 pounds per square inch steam pressure. The cooker was then opened and about 25 pounds of ground, de-fatted soya bean grits which had been previously soaked and tempered for about 1 hour with about 1 gallon of flavor solution was added to the mass in the cooker and the combined mass was cooked for an additional 20 minutes at 15 pounds per square inch steam pressure. The mass was then removed from the cooker and was found to have a moisture content of about 40 per cent. The mass was then dried at about 130° F., to a moisture content of approximately 24.6 per cent and was subsequently permitted to temper for a short period. The tempered mass was then shredded in the mill 18, and the shreds were dried at about 130° F., to 9.8 per cent moisture. Subsequently the dried shreds were toasted in the oven 30 at at about 425° F.

*Example IV*

Another example of my process employing heavy bran with soya comprises the cooking of 75 pounds of heavy bran, that is, bran with the flour dusted off, in the cooker 8 with about 2¾ gallons of flavoring solution. The bran was cooked for one hour at 17 pounds per square inch steam pressure in the cooker and the cooker was then opened and 25 pounds of de-fatted soya bean ground grits, which had been previously soaked and tempered with one gallon of flavoring solution for one hour, was introduced into the cooker, and the bran and soya were cooked together for an additional 20 minutes at 17 pounds steam pressure. The mass was then removed from the cooker and was found to have a moisture content of 39 per cent. The mass was subsequently dried at about 130° F., until its moisture content was reduced to 24.4 per cent and after tempering for one-half hour the mass was shredded in the mill 18. The shreds from the mill were then dried at 130° F., to a 10 per cent moisture content and were subsequently introduced into the oven 30 and toasted at about 425° F.

*Example V*

Another example of my process employing oat groats and soya comprises the cooking of 75 pounds of washed, tempered, steamed and bumped or deformed oat groats in the cooker 9 with 2¼ gallons of flavoring solution, the oat groats and flavoring solution being cooked for about 25 minutes at 15 pounds per square inch steam pressure. The cooker was then opened and 25 pounds of ground, de-fatted soya bean grits, which had been previously soaked and tempered with one gallon of flavoring solution for about one hour, were added and the oat groats and soya were cooked together for an additional 20 minutes at 15 pounds per square inch steam pressure. Upon removal of the mass from the cooker, the mass was found to have a moisture content of 40.8 per cent. The mass was subsequently dried at about 130° F., to a moisture content of 22 per cent, and after a short tempering period the mass was shredded in the mill 18 and subsequently dried to a 10 per cent moisture content. The dried shreds were toasted at about 425° F.

*Example VI*

Another example of my process employing rice and soya comprises utilizing 75 pounds of rice ground to about one-third size. The ground rice was placed in the cooker 9 and was steamed at about 25 pounds per square inch steam pressure for about 15 minutes. One and one-half gallons of flavoring solution was then added to the rice in the cooker and the same was cooked for a period of one hour at 17 pounds per square inch steam pressure. 25 pounds of de-fatted soya bean ground grits which had previously been soaked and tempered for one hour in one gallon of flavoring solution were then placed in the cooker with the rice and the entire mass was cooked for 20 minutes at 17 pounds per square inch steam pressure. When removed from the cooker the mass had a moisture content of 39.7 per cent. The mass was then dried at 150° F., to 27 per cent moisture content, tempered, and shredded while having a moisture content of 22 per cent. The shreds were then dried at 130° F., to a moisture content of 9.6 per cent and toasted at 410° F.

I claim as my invention:

1. A process of making a ready-to-eat food product of the shredded breakfast cereal type by compositing cereal grain particles in amount from about 85 to about 60 per cent by weight and de-fatted soya bean particles in amount from about 15 to about 40 per cent by weight in a two-stage cooking process which comprises, subjecting said cereal grain particles to a cooking operation in the presence of moisture by first partially cooking same alone, adding de-fatted soya bean particles to said partially cooked cereal, co-jointly admixing and cooking the mixture to partially cook and soften said soya particles and without substantial discoloration and darkening by hydrolysis of the protein content thereof and to complete said cereal cooking to superficially gelatinize the particles thereof and to render same soft and pliable with substantially no free starch or white centers the resultant mass being in a form of discrete particles with the soya particles lightly adhered to the cereal particles, subsequently shredding the cooked particle composite under pressure to produce shreds thereof with the soya particles inseparably cohered to the cereal particles in a substantially uniformly finely divided homogeneous composite, and toasting the resultant shreds to a brown and slightly puffed and blistered condition, said final product being substantially devoid of inherent palatably objectionable characteristics of the soya particles.

2. A process of making a ready-to-eat food product of the shredded breakfast cereal type by compositing approximately 75 parts by weight of cereal grain particles and approximately 25 parts by weight of de-fatted soya bean particles in a two-stage cooking process which comprises, subjecting said cereal grain particles to a cooking operation in the presence of moisture by first partially cooking same alone, adding de-fatted soya bean particles to said partially cooked cereal, co-jointly admixing and cooking the mixture to partially cook and soften said soya particles and without substantial discloration and darkening by hydrolysis of the protein content thereof and to complete said cereal cooking to superficially gelatinize the particles thereof and to render same soft and pliable with substantially no free starch or white centers, discharging the resultant material in a form of discrete particles with the soya particles lightly adhered to the cereal particles, partially drying and subsequently shredding the cooked particle composite under pressure to produce shreds thereof composed of soya particles inseparably cohered to cereal particles in a substantially uniformly finely divided homogeneous composite, and toasting the resultant shreds to a brown and slightly puffed and blistered condition, said final product being substantially devoid of inherent palatably objectionable characteristics of the soya particles.

3. A process of making a ready-to-eat food product of the shredded breakfast cereal type by compositing corn particles in amount from about 85 to about 60 per cent by weight and de-fatted soya bean particles in amount from about 15 to about 40 per cent by weight in a two-stage cooking process which comprises, subjecting said corn particles to a cooking operation in the presence of moisture by first partially cooking same alone, adding de-fatted soya bean particles to said partially cooked corn, co-jointly admixing and cooking the mixture to partially cook and soften said soya particles and without substantial discoloration and darkening by hydrolysis of the protein content thereof and to complete said corn cooking to superficially gelatinize the particles thereof and to render same soft and pliable with substantially no free starch or white centers the resultant mass being in a form of discrete particles with the soya particles lightly adhered to the corn particles, subsequently shredding the cooked particle composite under pressure to produce shreds thereof with the soya particles inseparably cohered to the corn particles in a substantially uniformly finely divided homogeneous composite, and toasting the resultant shreds to a brown and slightly puffed and blistered condition, said final product being substantially devoid of inherent palatably objectionable characteristics of the soya particles.

4. A process of making a ready-to-eat food product of the shredded breakfast cereal type by compositing rice particles in amount from about 85 to about 60 per cent by weight and de-fatted soya bean particles in amount from about 15 to about 40 per cent by weight in a two-stage cooking process which comprises, subjecting said rice particles to a cooking operation in the presence of moisture by first partially cooking same alone, adding de-fatted soya bean particles to said partially cooked rice, co-jointly admixing and cooking the mixture to partially cook and soften said soya particles and without substantial discoloration and darkening by hydrolysis of the protein content thereof and to complete said rice cooking to superficially gelatinize the particles thereof and to render same soft and pliable with substantially no free starch or white centers the resultant mass being in a form of discrete particles with the soya particles lightly adhered to the rice particles, subsequently shredding the cooked particle composite under pressure to produce shreds thereof with the soya particles inseparably cohered to the rice particles in a substantially uniformly finely divided homogeneous composite, and toasting the resultant shreds to a brown and slightly puffed and blistered condition, said final product being substantially devoid of inherent palatably objectionable characteristics of the soya particles.

5. A process of making a ready-to-eat food product of the shredded breakfast cereal type by compositing wheat particles in amount from about 85 to about 60 per cent by weight and de-fatted soya bean particles in amount from about 15 to about 40 per cent by weight in a two-stage cooking process which comprises, subjecting said wheat particles to a cooking operation in the presence of moisture by first partially cooking same alone, adding de-fatted soya bean particles to said partially cooked wheat, co-jointly admixing and cooking the mixture to partially cook and soften said soya particles and without substantial discoloration and darkening by hydrolysis of the protein content thereof and to complete said wheat cooking to superficially gelatinize the particles thereof and to render same soft and pliable with substantially no free starch or white centers the resultant mass being in a form of discrete particles with the soya particles lightly adhered to the wheat particles, subsequently shredding the cooked particle composite under pressure to produce shreds thereof with the soya particles inseparably cohered to the wheat particles in a substantially uniformly finely divided homogeneous composite, and toasting the resultant shreds to a brown and slightly puffed and blistered condition, said final product being substantially devoid of inherent palatably objectionable characteristics of the soya particles.

WILLIAM P. PENTY.

REFERENCES CITED

The following references are of record in the file of this patent:

UNITED STATES PATENTS

| Number | Name | Date |
| --- | --- | --- |
| 1,430,670 | Morgan | Oct. 3, 1922 |
| 2,182,175 | Gates | Dec. 5, 1939 |
| 2,098,544 | Hill | Nov. 9, 1937 |
| 2,093,260 | Welder | Sept. 14, 1937 |
| 2,260,254 | Kruse | Oct. 21, 1941 |
| 2,130,087 | Hasbrouck | Sept. 13, 1938 |
| 1,260,656 | Bollmann | Mar. 26, 1918 |
| 2,267,747 | Plews | Dec. 30, 1941 |

FOREIGN PATENTS

| Number | Country | Date |
| --- | --- | --- |
| 30,350 | Great Britain | 1910 |